(12) United States Patent
Chua et al.

(10) Patent No.: US 11,527,057 B2
(45) Date of Patent: Dec. 13, 2022

(54) SYSTEM AND METHOD FOR LICENSE PLATE RECOGNITION

(71) Applicant: Realtek Singapore Private Limited, Singapore (SG)

(72) Inventors: Tien Ping Chua, Singapore (SG); Chen-Feng Kuo, Hsinchu (TW); Ruchi Mangesh Dhamnaskar, Singapore (SG); Zhengyu Li, Singapore (SG); Sin Yi Heung, Singapore (SG)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 146 days.

(21) Appl. No.: 17/037,705

(22) Filed: Sep. 30, 2020

(65) Prior Publication Data

US 2022/0101037 A1    Mar. 31, 2022

(51) Int. Cl.
*G06V 10/00*   (2022.01)
*G06V 10/75*   (2022.01)
(Continued)

(52) U.S. Cl.
CPC ......... *G06V 10/751* (2022.01); *G06K 9/6277* (2013.01); *G06T 7/194* (2017.01);
(Continued)

(58) Field of Classification Search
CPC .... G06V 10/751; G06V 20/625; G06V 30/10; G06K 9/6277; G06T 7/194; G06T 2207/20084
See application file for complete search history.

(56) References Cited

U.S. PATENT DOCUMENTS

2010/0054539 A1* 3/2010 Challa .................. G06V 20/63
                                                    382/105
2013/0084007 A1* 4/2013 Salamati ............... G06T 7/162
                                                    382/173
(Continued)

FOREIGN PATENT DOCUMENTS

JP    2005301672 A  * 10/2005   ......... G06K 9/00456
TW    200532586       10/2005
(Continued)

OTHER PUBLICATIONS

Chua, the specification, including the claims, and drawings in the U.S. Appl. No. 16/655,212, filed Oct. 16, 2019.

*Primary Examiner* — Nancy Bitar
*Assistant Examiner* — Xiao Liu
(74) *Attorney, Agent, or Firm* — McClure, Qualey & Rodack, LLP

(57) ABSTRACT

A license plate recognition system includes an image capturing module, a license plate detection module, a segment extraction module, a character classification module, and a character recognition module. The image capturing module is for capturing an image. The license plate detection module is for receiving the image and to identify a license plate in the image. The segment extraction module is for extracting a sequence of character segments on the license plate. The character classification module is for computing a probability of each possible character in each character segment. The character recognition module is for identifying permissible characters for the each character segment according to a syntax of the sequence of character segments, and to identify a character having a highest probability among the permissible characters as a selected character for the each character segment.

10 Claims, 11 Drawing Sheets

(51) Int. Cl.
_G06K 9/62_ (2022.01)
_G06T 7/194_ (2017.01)
_G06V 20/62_ (2022.01)
_G06V 30/10_ (2022.01)

(52) U.S. Cl.
CPC .. _G06T 2207/20084_ (2013.01); _G06V 20/625_ (2022.01); _G06V 30/10_ (2022.01)

(56) References Cited

U.S. PATENT DOCUMENTS

| | | | |
|---|---|---|---|
| 2013/0279758 A1* | 10/2013 | Burry | G06V 30/15 |
| | | | 382/105 |
| 2015/0139498 A1* | 5/2015 | Rotatori | G01B 11/02 |
| | | | 382/104 |
| 2018/0300578 A1* | 10/2018 | Wilbert | G06V 10/987 |
| 2019/0043207 A1 | 2/2019 | Carranza | |
| 2020/0293794 A1* | 9/2020 | Popov | G06N 20/10 |
| 2020/0401834 A1* | 12/2020 | Das | G06V 10/30 |

FOREIGN PATENT DOCUMENTS

| | | |
|---|---|---|
| TW | M397335 U1 | 2/2011 |
| TW | 201218129 A1 | 5/2012 |
| TW | M605360 U | 12/2020 |

* cited by examiner

SYSTEM AND METHOD FOR LICENSE PLATE RECOGNITION

BACKGROUND OF THE INVENTION

1. Field of the Invention

The present invention is related to license plate recognition, and particularly to a system and a method for license plate recognition.

2. Description of the Prior Art

In the field of image processing, the vehicle license plate recognition technology has contributed much to public security and cost reduction via applying to automatic tolling, parking lot management, stolen vehicle detection, etc.

In applications of the vehicle license plate recognition technology, scenes including complicated contents like advertisement signs and traffic signs will disturb the accuracy of recognition; noisy backgrounds of the license plate, the color and style of the vehicle license plate, the decorative accessories, etc., may also affect the result of recognition; various illumination environments, such as daytime, night, rainy day, etc., will also lead to the failure of recognition; different viewing angles will capture inclined license plates. All the above-mentioned factors would increase the difficulty of recognizing a vehicle license plate. Further, lights, bumpers, logos, frames, screws and characters on vehicles may have some similar features to those of vehicle license plates and thus will disturb the accuracy of license palate recognition. In conventional license plate recognition technologies, the vehicle license plate will be first binarized to two levels (black and white). Then, the output of binarization is partitioned into several pieces of character-related data through histogram projection. Next, the several pieces of character-related data are input into a classifier, which has been trained for recognizing characters. Then, the recognition results are assembled to obtain a complete license plate identifier (for recognizing characters on the vehicle license plate). The conventional recognition methods are likely to be influenced by noise or contamination on the vehicle license plate. In an image of a vehicle, the license plate often occupies only a small area. However, the small area contains not only the characters of the license plate but also the surroundings of characters. In such a case, it is less likely to obtain stable binarized data. Consequently, a satisfactory recognition result is hard to be obtained from the binarized information containing a great amount of noise.

SUMMARY OF THE INVENTION

An embodiment provides license plate recognition system including an image capturing module, a license plate detection module, a segment extraction module, a character classification module, and a character recognition module. The image capturing module is configured to capture an image. The license plate detection module is configured to receive the image and to identify a license plate in the image. The segment extraction module is configured to extract a sequence of character segments on the license plate. The character classification module is configured to compute a probability of each possible character in each character segment. The character recognition module is configured to identify permissible characters for the each character segment according to a syntax of the sequence of character segments, and to identify a character having a highest probability among the permissible characters as a selected character for the each character segment.

Another embodiment provides a method for license plate recognition. The method includes capturing an image, identifying a license plate in the image, extracting a sequence of character segments on the license plate, computing a probability of each possible character in each character segment, identifying permissible characters for the each character segment according to a syntax of the sequence of character segments, and identifying a character having a highest probability among the permissible characters as a selected character for the each character segment.

Another embodiment provides a method for extracting character segments on a license plate. The method includes cropping a license plate from an image, converting the license plate to a grayscale image, performing binary thresholding on the grayscale image to generate a binary image, performing binary segmentation on the binary image to identify possible character segments, assuming a pixel value of characters on the license plate is higher than a pixel value of a background of the license plate, counting a number of possible character segments, and if the number of possible character segments does not match an expected value, inverting the binary image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
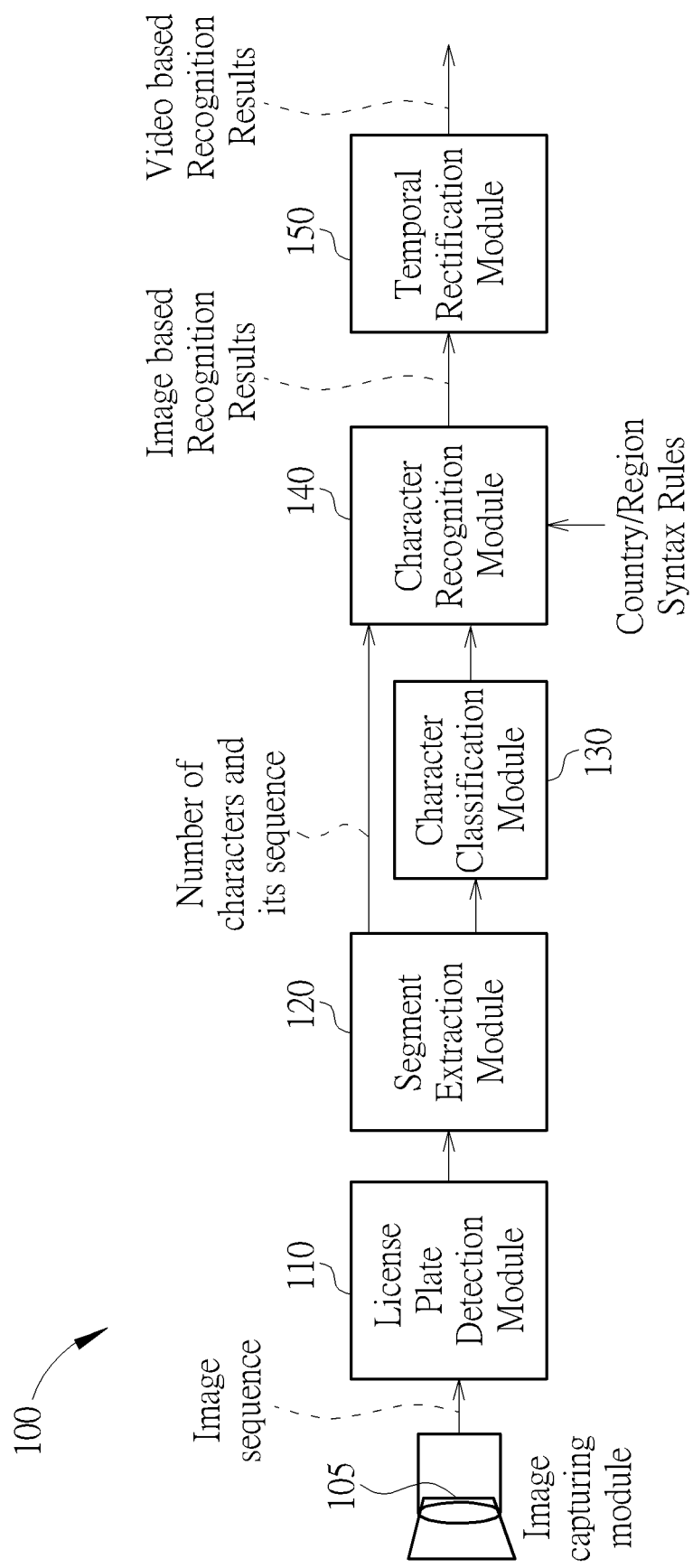
FIG. 1 is a license plate recognition system of an embodiment of the present invention.

FIG. 1 is a license plate recognition system 100 of an embodiment of the present invention. The license plate recognition system 100 includes an image capturing module 105, a license plate detection module 110, a segment extraction module 120, a character classification module 130, and a character recognition module 140. Optionally, a temporal rectification module 150 can also be included in the license plate recognition system 100.

The image capturing module 105 is configured to capture an image. The license plate detection module 110 is configured to receive the image and to identify a license plate in the image. The segment extraction module 120 is configured to extract a sequence of character segments on the license plate. The character classification module 130 is configured to compute a probability of each possible character in each character segment. The character recognition module 140 is configured to identify permissible characters for the each character segment according to a syntax of the sequence of character segments, and to identify a character having a highest probability among the permissible characters as a selected character for the each character segment. The temporal rectification module 150 is configured to rectify the selected character according to a maximum occurrence of a character in the same position. The function of each module will be described in more detail in the following paragraphs.

In this embodiment, the image capturing module 105 can be a camera or any device that can capture images. The license plate detection module 110, the segment extraction module 120, the character classification module 130, the character recognition module 140 and the temporal rectification module 150, each can comprise a neural network model trained for the above-mentioned functions.

Figure 2:
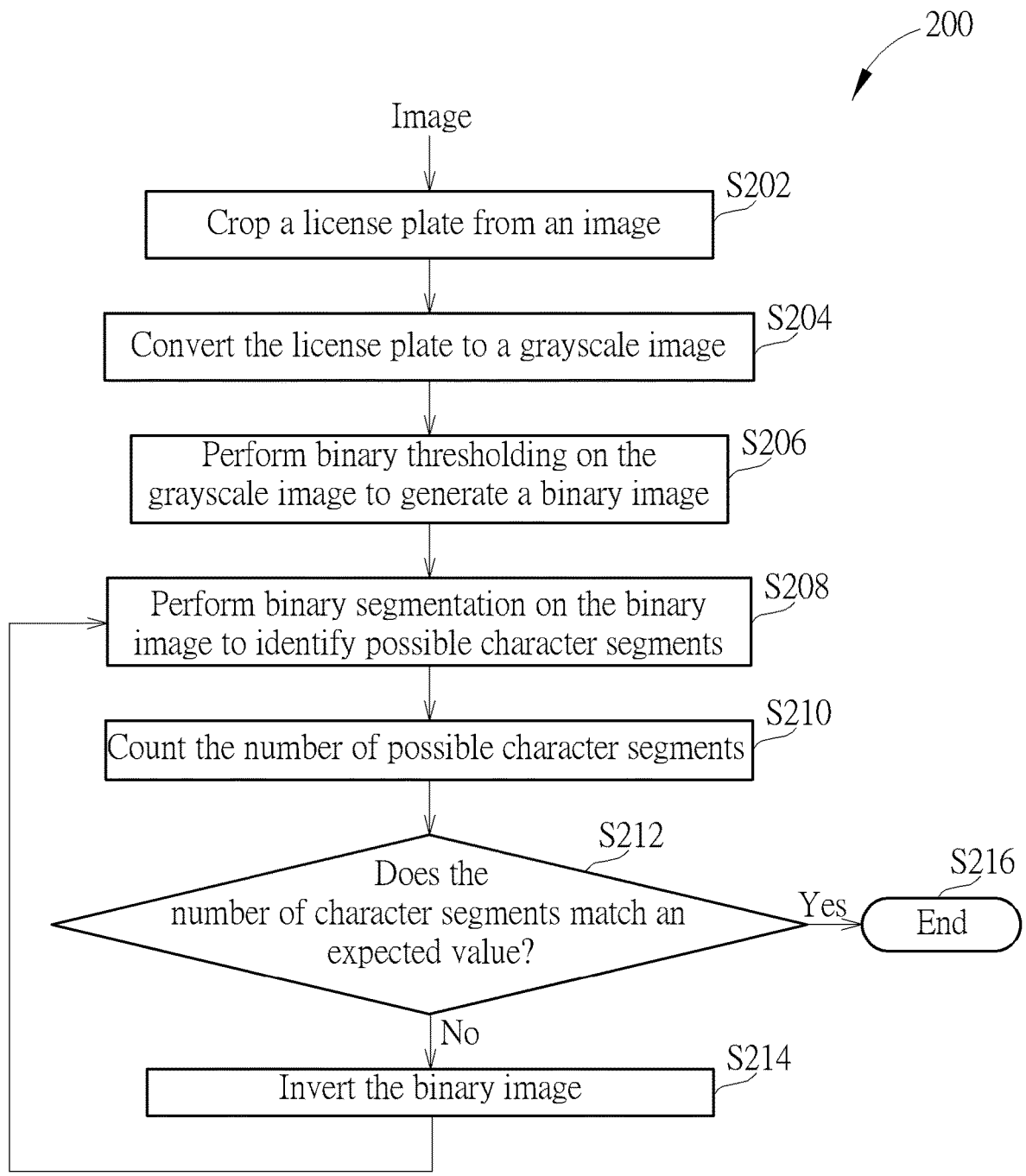
FIG. 2 is a flowchart of a method implemented by the segment extracting module in FIG. 1 for extracting character segments from a license plate.

FIG. 2 is a flowchart of a method 200 implemented by the segment extracting module 120 for extracting character segments from a license plate. The method 200 is implemented by the segment extraction module 120. The method includes the following steps.

S202: Crop a license plate from an image;
S204: Convert the license plate to a grayscale image;
S206: Perform binary thresholding on the grayscale image to generate a binary image;
S208: Perform binary segmentation on the binary image to identify possible character segments;
S210: Assuming a pixel value of characters on the license plate is higher than a pixel value of a background of the license plate, count the number of possible character segments; and
S212: Does the number of possible character segments substantially match an expected value? If so, go to step S216; if not, perform step S214;
S214: Invert the binary image, go to step S208;
S216: End of the process.

Firstly, the license plate is cropped from the image based on the location information provided by license plate detection module 110. The segment extraction module 120 converts color image of cropped license plate to a grayscale image. The grayscale image is then converted to a binary image through binary thresholding. Then, binary segmentation is performed to generate segments of each character and its bounding box. Next, the segment extraction module 120 identifies possible character segment based on the size of the segments and aspect ratio of its bounding boxes and an aspect ratio of license plate. Other segments such as plate frame, bolts and nuts are removed. If the number of character segments obtained substantially matches to an expected value obtained from regulation syntax, then proceed to character classification processing. Otherwise, inverted binary thresholding is applied to the grayscale image to generate an inverted binary image. Then binary segmentation is performed on the inverted binary image. The segment extraction module 120 can determine that the background of the license plate is brighter than characters if the number of possible character segments does not substantially match the expected value, and vice versa. This way would make sure that either kind of license plate can be correctly recognized.

Figure 3:
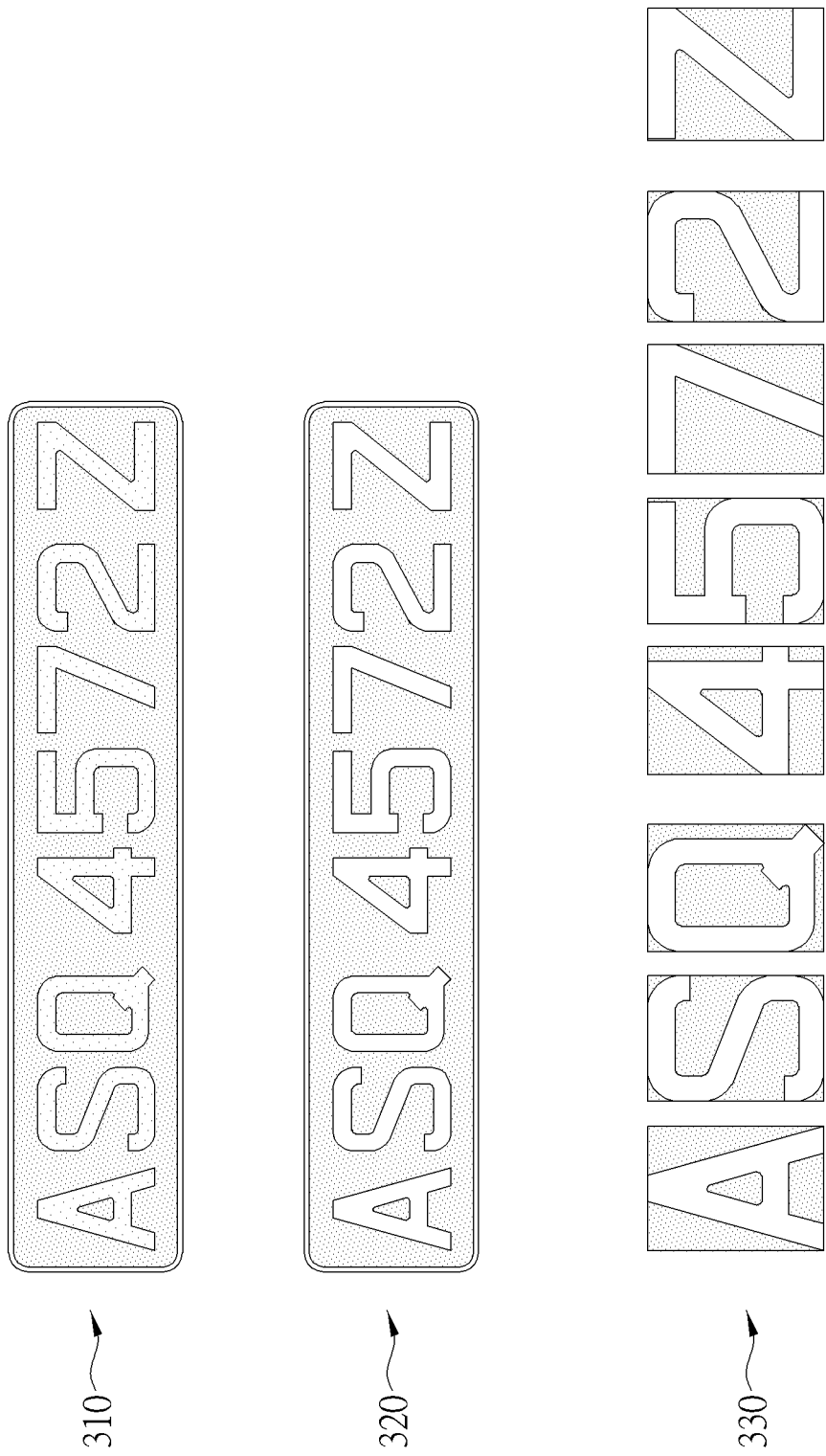
FIG. 3 is a diagram illustrating the segment extraction module in FIG. 1 extracting the character segments from a license plate.

FIG. 3 is a diagram illustrating the segment extraction module 120 extracting the character segments from a license plate. The license plate 310 is a grayscale image of the license plate. The binary image 320 is generated by performing binary thresholding on the grayscale image 310. The segment extraction module 120 then extracts the character segments from the binary image 320. The image segments 330 include each character segment extracted and each character is enclosed by its bounding box.

Figure 4B:
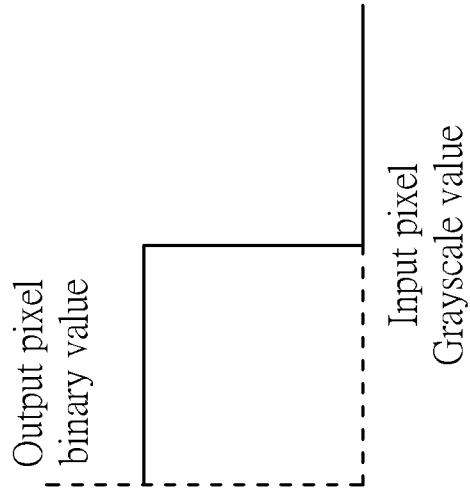
FIGS. 4A and 4B are diagrams illustrating binary thresholding and inverted binary thresholding performed in the method of FIG. 2.
Figure 4A:
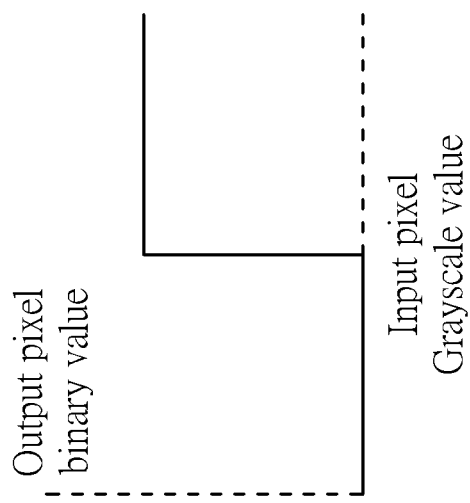

FIGS. 4A and 4B are diagrams illustrating binary thresholding and inverted binary thresholding performed in the method 200. A binary image is an image with pixels having either one of two values. The low pixel value indicates a low brightness level and the high pixel value indicates a high brightness level. FIG. 4A illustrates binary thresholding applied to convert the grayscale image 310 to binary image 320. For each pixel, if the pixel value is higher than a threshold value, for example, a pixel value of 120, it is translated to a high pixel value in binary image; if the pixel value is lower than the threshold value, it is translated to a low pixel value in binary image 320. FIG. 4B illustrates inverse binary thresholding applied to convert grayscale image to binary image. For each pixel, if the pixel value is lower than the threshold value, it is translated to a high pixel value in binary image; if the pixel value is higher than the threshold value, it is translated to a low pixel value in binary image.

Figure 5:
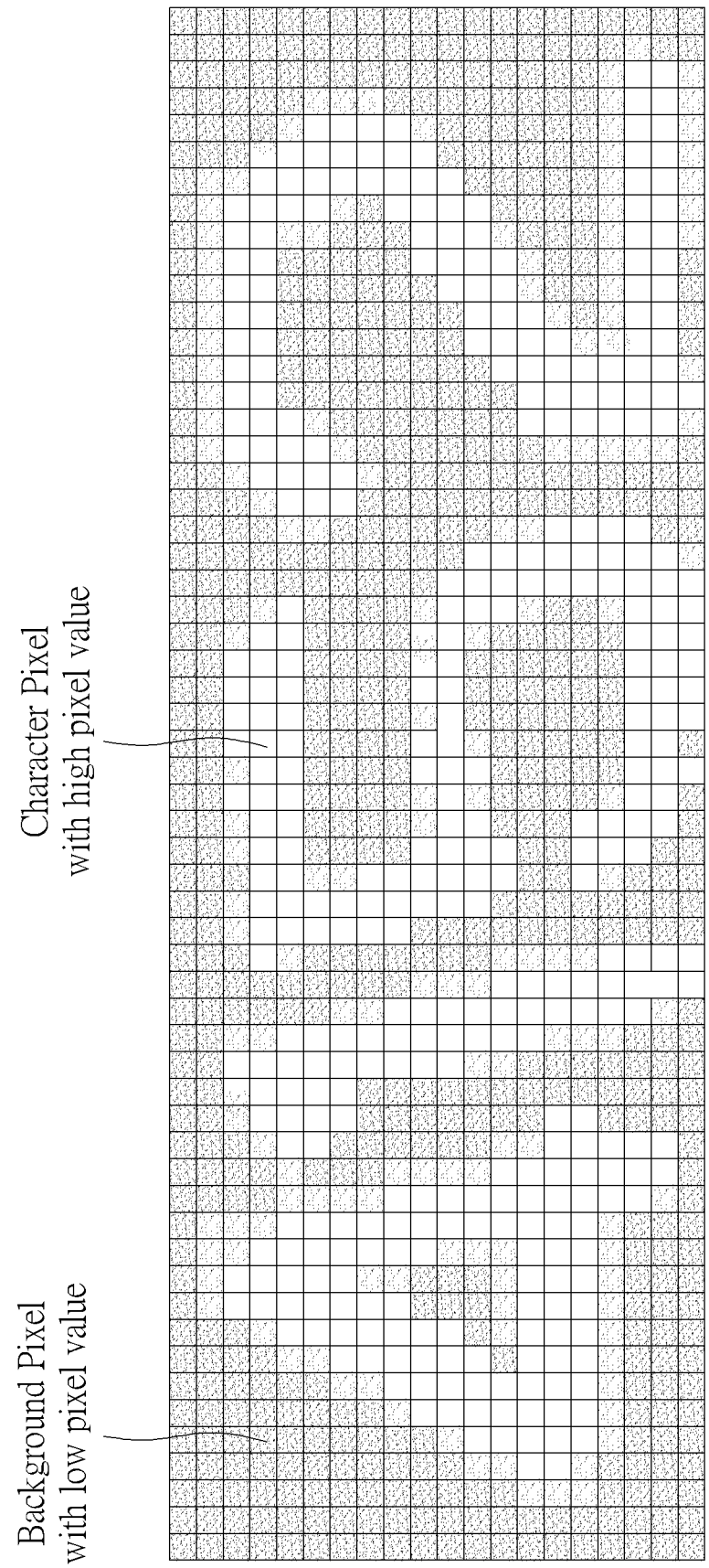
FIG. 5 is a diagram illustrating an exemplary binary image of a license plate.

FIG. 5 is a diagram illustrating an exemplary binary image of a license plate. In this embodiment, the characters have a high pixel value and the background have a low pixel value. When the pixel value of the characters is known, a binary segmentation method can be applied to generate character segments corresponding to each character. A fast binary segmentation method described in U.S. application Ser. No. 16/655,212 is applied in this embodiment to generate character segments.

Figure 6:
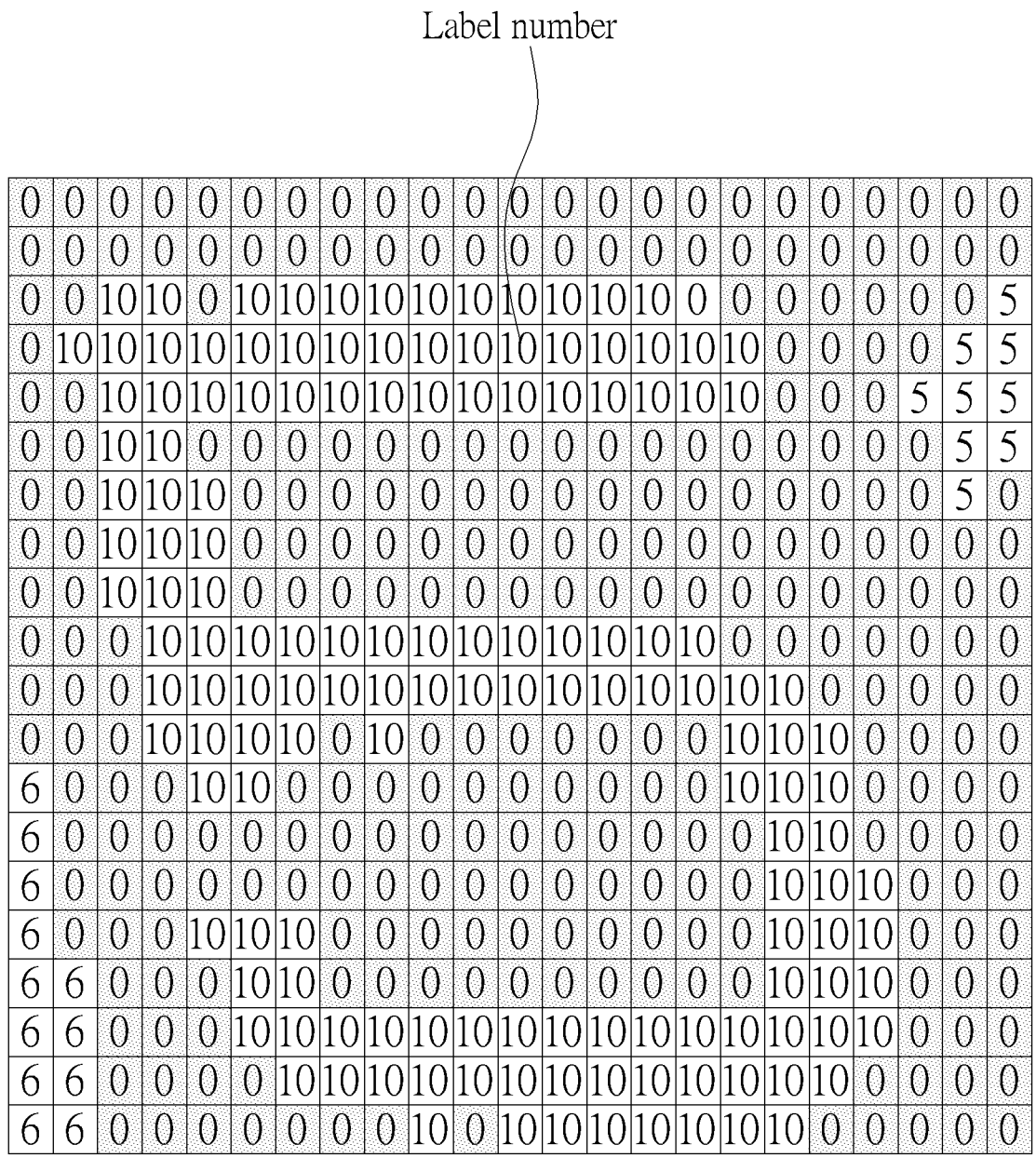
FIG. 6 is a diagram illustrating the characters and the background being identified with different label.

FIG. 6 illustrates the characters and the background being identified with different label numbers. During the fast binary segmentation process, each pixel would be labeled with a label number. The pixel with same label number is identified to belong to the same character. For example, the pixels with the label number "10" belong to the character "5". The pixels with the label number "0" belong to the background.

Figure 7:
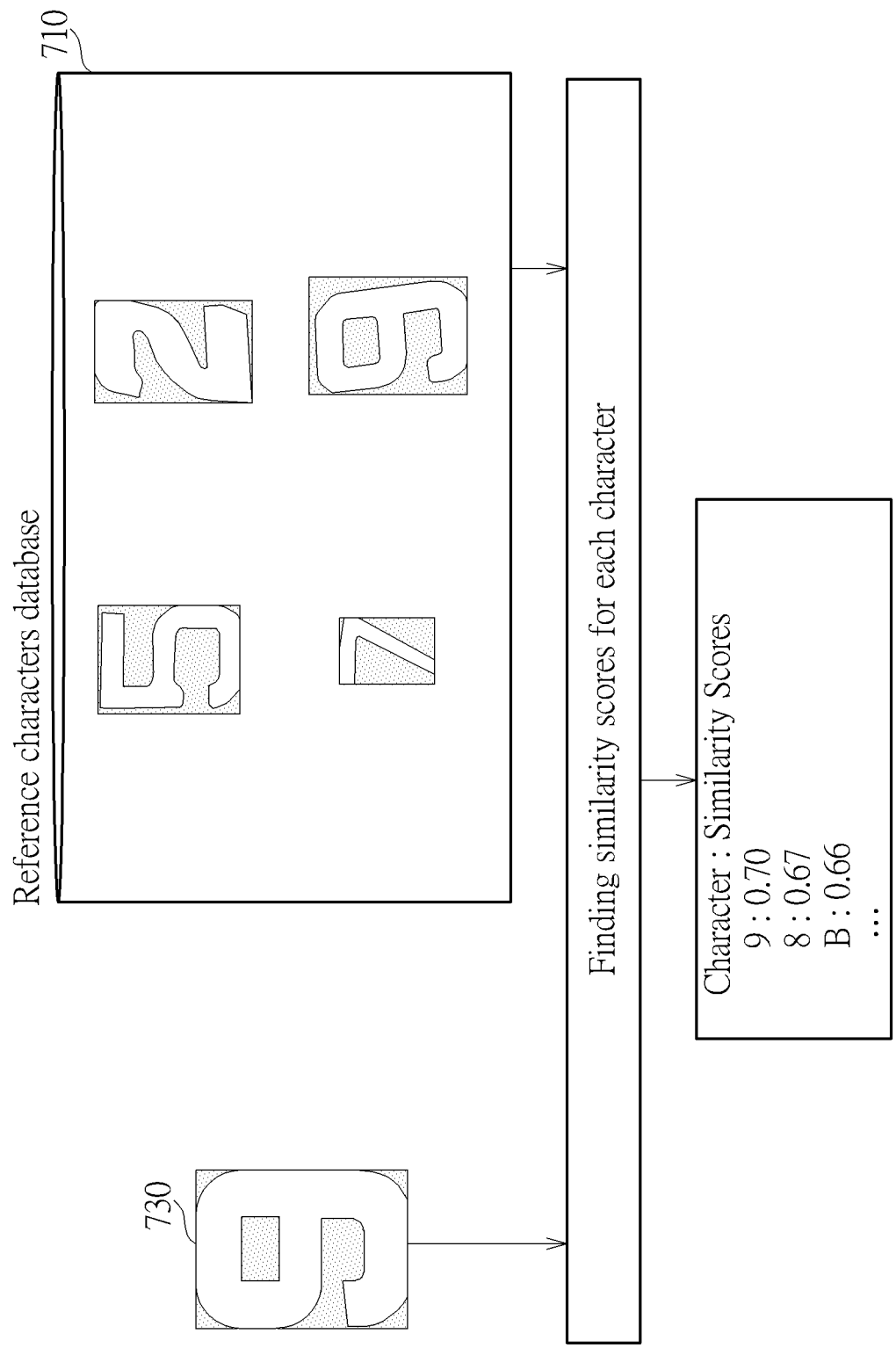
FIG. 7 is a diagram illustrating the character classification module in FIG. 1 using template matching to obtain similarity scores.

FIG. 7 is a diagram illustrating the character classification module 130 using template matching to obtain similarity scores. A character segment 730 is compared with characters in a character reference database 710 to obtain similarity scores. For example, the character segment 730 has the highest similarity score for character "9" when comparing with all the characters in the character reference database 710. The similarity score can be translated to the probability of each possible character matching the character segment 730. Then, the character with the highest probability is identified to be a selected character for that character segment.

Figure 8:
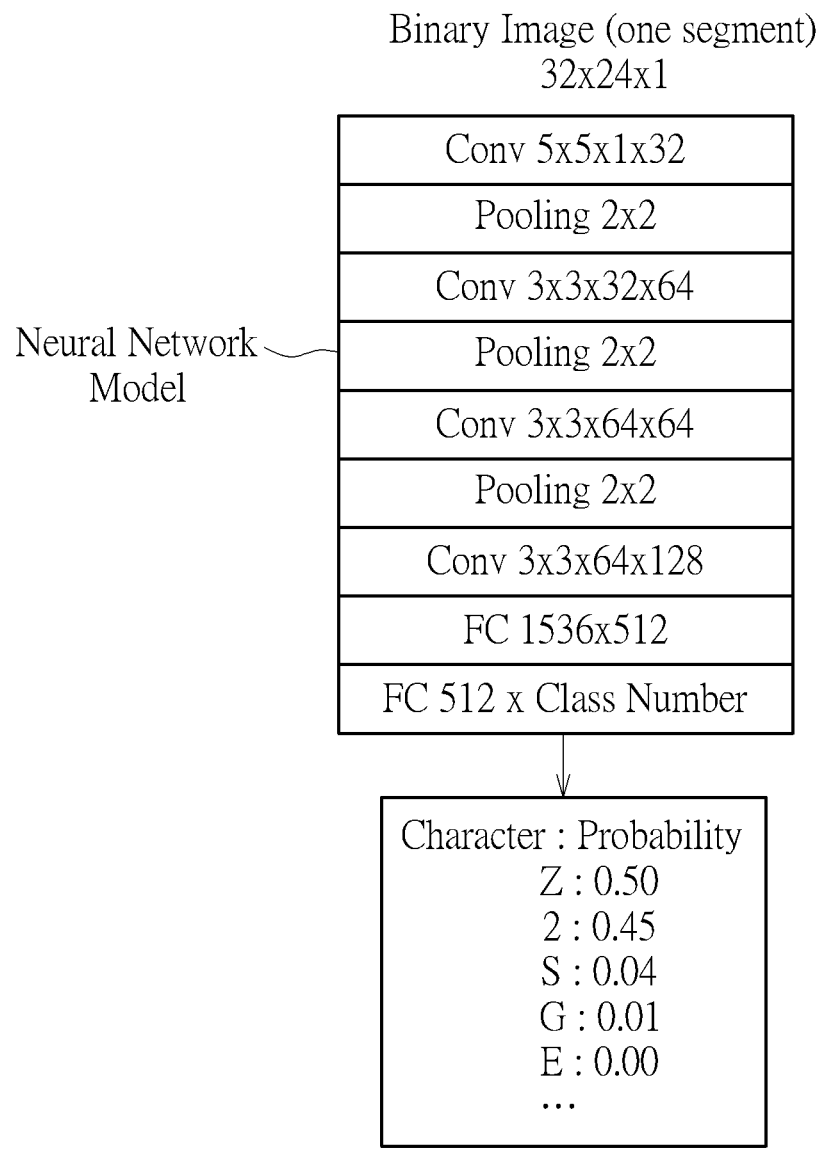
FIG. 8 is a diagram illustrating the character classification module in FIG. 1 computing the probabilities of characters.

FIG. 8 illustrates the character classification module 130 computing the probabilities of characters. In one embodiment, the character classification module 130 includes a neural network model trained for computing the probabilities of the characters. The neural network model includes a neural network and its parameters, known as weights. The weights are learned after training the model with example data. The image segments 330 are resized to 32 pixels in width and 24 pixels in height. The 32×24×1 pixel values are input to the neural network model for generating probability of each character.

Figure 9:
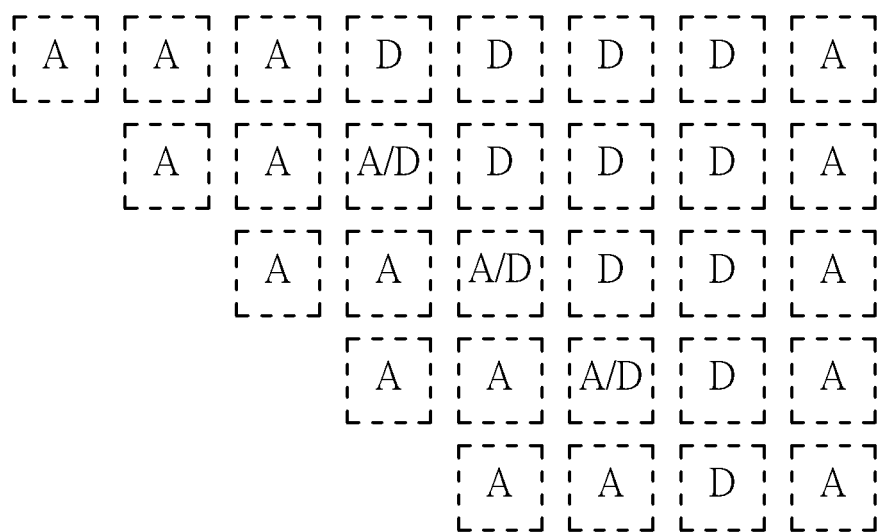
FIG. 9 is a diagram illustrating the recognition process of the character recognition module in FIG. 1 based on syntax rules.

FIG. 9 is a diagram illustrating the recognition process of the character recognition module 140 based on syntax rules. For example, according license plate regulation in Singapore, the number of characters ranges from 4 to 8 characters. In this figure, "A" indicates that the character in that position must be an alphabet. "D" indicates that the character in that position must be a digit. "A/D" indicates that the character in that position can be either an alphabet or a digit. The license plate number starts with an alphabet and continues for next one or two characters being alphabets. Alphabets "I" and "O" are not permissible in the license plate. The next few characters can be numbers ranging from 1 to 9999, and the numbers cannot start with 0. The last character is an alphabet as a checksum. It can be "F", "I", "N", "O", "Q" or "V". Hence, the above description demonstrates the syntax rules can help the character recognition module 140 recognize the characters in their proper positions.

Figure 10:
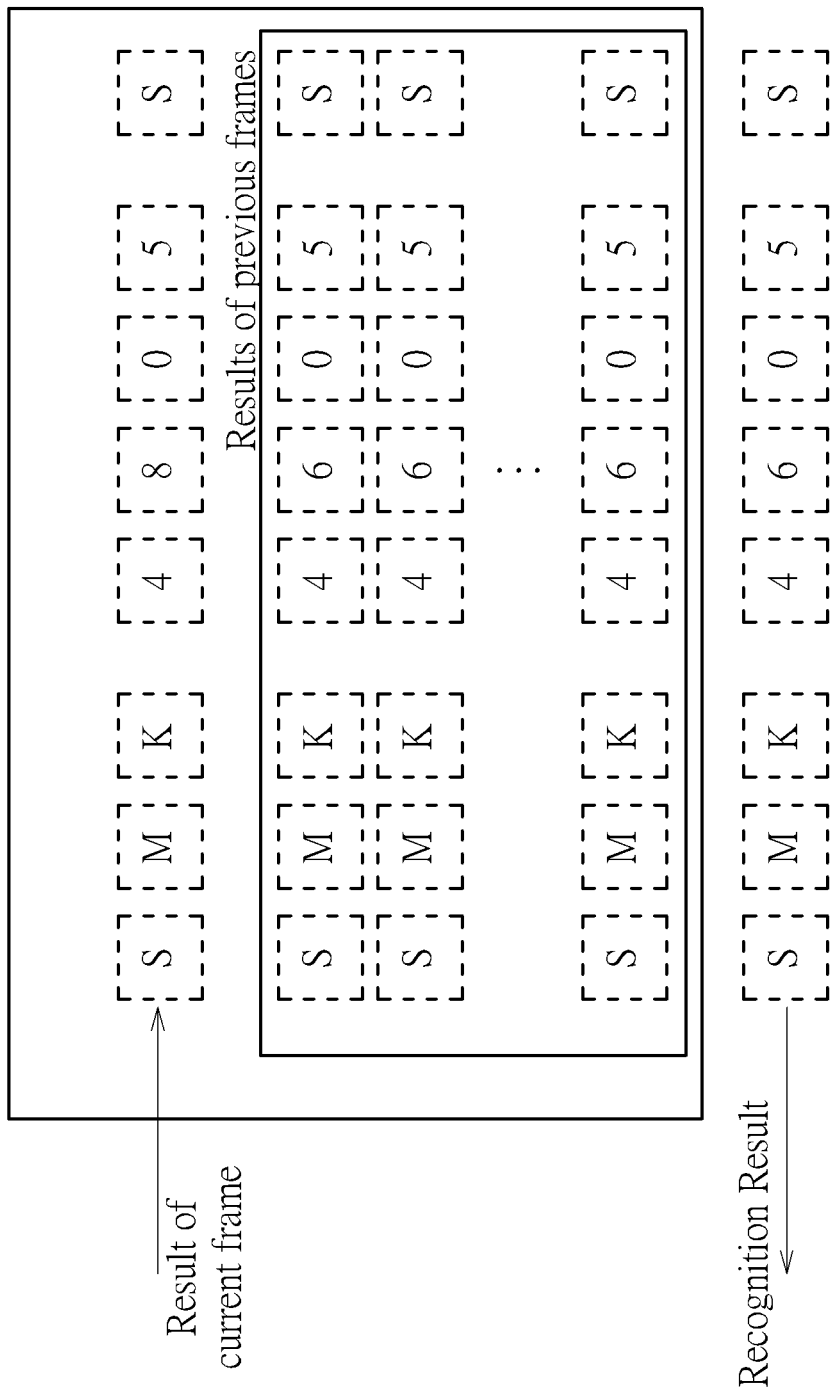
FIG. 10 is a diagram illustrating the rectification process implemented by the temporal rectification module in FIG. 1.

FIG. 10 is a diagram illustrating the rectification process implemented by the temporal rectification module 150. The temporal rectification module 150 is optional, however, it can increase the accuracy of the recognition results. The image captured by the image capturing module 105 can be a current frame of a video sequence. There may be previous frames in a video sequence went through the license plate recognition process and saved in a database in the temporal rectification module 150. The license plate recognition result of the current frame can be compared with the recognition results from the previous frames. The temporal rectification can be performed on each individual character position. The character with maximum number of occurrences can be identified as the correct character. This way the accuracy of the recognition is increased.

Figure 11:
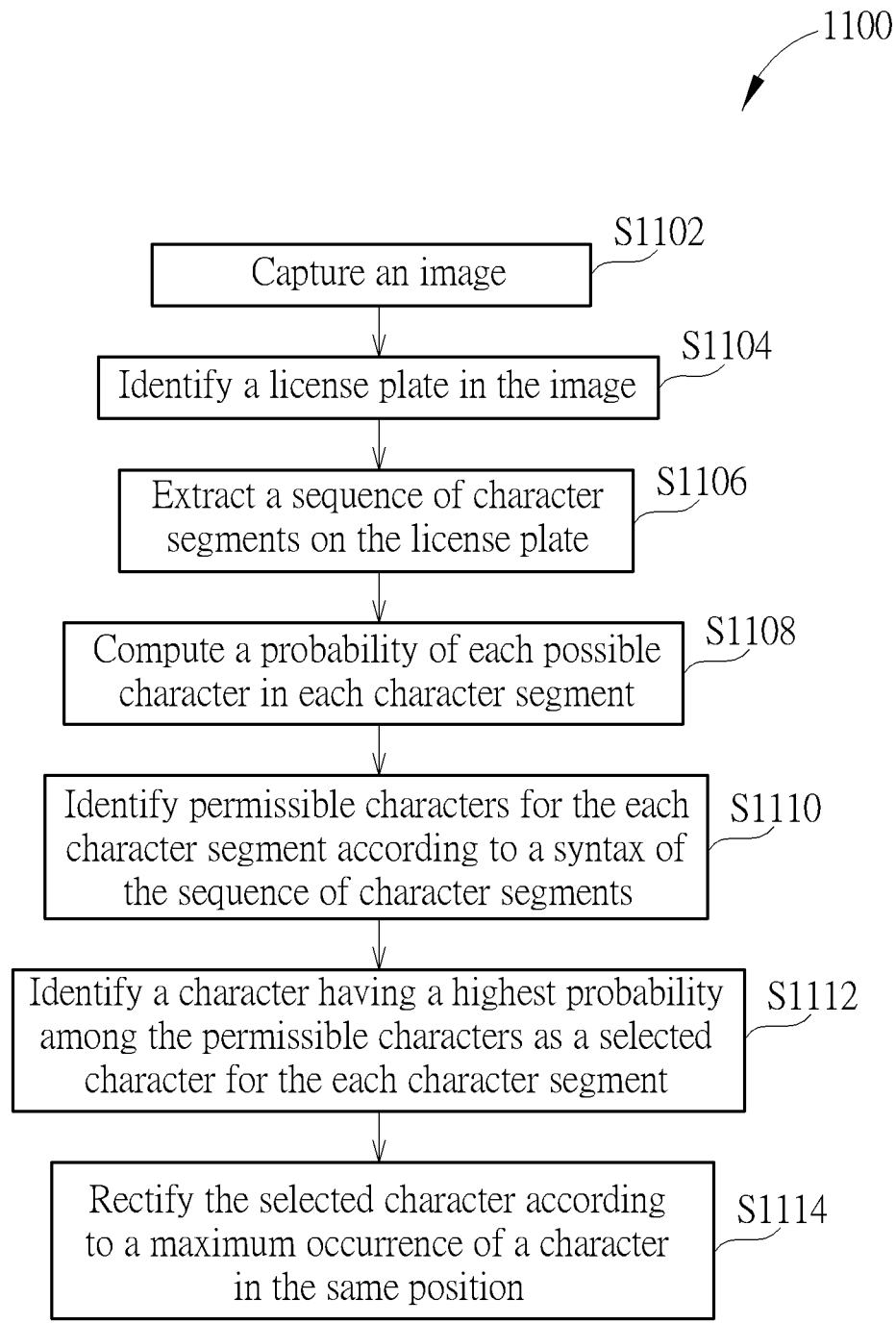
FIG. 11 is a flowchart of a method for license plate recognition implemented by the license plate recognition system in FIG. 1.

FIG. 11 is a flowchart of a method 1100 for license plate recognition implemented by the license plate recognition system 100. The method includes the following steps.

S1102: Capture an image;
S1104: Identify a license plate in the image;
S1106: Extract a sequence of character segments on the license plate;
S1108: Compute a probability of each possible character in each character segment;
S1110: Identify permissible characters for the each character segment according to a syntax of the sequence of character segments;
S1112: Identify a character having a highest probability among the permissible characters as a selected character for the each character segment; and
S1114: Rectify the selected character according to a maximum occurrence of a character in the same position.

The temporal rectification of the step S1114 is optional. However, implementing temporal rectification can increase the accuracy of the recognition results.

In summary, the license plate recognition system and method provided by the embodiment can quickly and accurately recognize the characters on a license plate. The system including multiple modules is for license plate recognition. Within each module, various techniques and methods are implemented. Therefore, the system and method can easily obtain a satisfactory recognition result from a color image containing a license plate with much smaller datasets comparing to the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A license plate recognition system comprising:
an image capturing module configured to capture an image;
a license plate detection module configured to receive the image and to identify a license plate in the image;
a segment extraction module configured to extract a sequence of character segments on the license plate, by:
cropping a license plate portion from the image;
converting the license plate portion to a grayscale image;
performing binary thresholding on the grayscale image to generate a binary image;
performing binary segmentation on the binary image to identify possible character segments;
counting a number of possible character segments;
determining whether the number of possible character segments matches an expected value; and
if the number of possible character segments does not match the expected value, inverting the binary image and return to the operation of performing binary segmentation;
a character classification module configured to compute a probability of each possible character in each character segment; and
a character recognition module configured to identify permissible characters for the each character segment according to a syntax of the sequence of character segments, and to identify a character having a highest probability among the permissible characters as a selected character for the each character segment.

2. The system of claim 1, further comprising: a temporal rectification module configured to rectify the selected character according to a maximum occurrence of a character in a same position.

3. The system of claim 1, wherein the segment extraction module extracts the sequence of character segments with a background of the license plate having a high pixel value and characters having a low pixel value.

4. The system of claim 1, wherein the segment extraction module extracts the sequence of character segments with a background of the license plate having a low pixel value and characters having a high pixel value.

5. The system of claim 1, wherein the license plate detection module comprises a neural network model trained to identify the license plate in the image.

6. The system of claim 1, wherein the character classification module computes the probability of the each possible character in the each character segment by comparing the each possible character in the each character segment with reference characters in a database.

7. A method for extracting character segments on a license plate, comprising:
cropping a license plate from an image;
converting the license plate to a grayscale image;
performing binary thresholding on the grayscale image to generate a binary image;
performing binary segmentation on the binary image to identify possible character segments;
assuming a pixel value of characters on the license plate is higher than a pixel value of a background of the license plate, counting a number of possible character segments; and if the number of possible character segments does not match an expected value, inverting the binary image, and returning to the step of performing binary segmentation.

8. The method of claim 7 further comprising: determining a character segment to be valid by comparing a size of character segment to a size of the license plate, and an aspect ratio of the character segment to aspect ratio of the license plate.

9. The method of claim 7 further comprising: determining the background of the license plate to be brighter than characters if the number of possible character segments does not match the expected value.

10. The method of claim 7 further comprising: determining the characters is brighter than the background of the license plate if the number of possible character segments matches the expected value.

* * * * *